United States Patent [19]

Lindstrom

[11] 4,181,776

[45] Jan. 1, 1980

[54] CHEMOELECTRIC CELL

[75] Inventor: Olle B. Lindstrom, Taby, Sweden

[73] Assignee: AB Olle Lindstrom, Taby, Sweden

[21] Appl. No.: 881,606

[22] Filed: Feb. 27, 1978

Related U.S. Application Data

[63] Continuation of Ser. No. 696,925, Jun. 17, 1976, abandoned.

[30] Foreign Application Priority Data

Jun. 18, 1975 [SE] Sweden .................................. 7507041

[51] Int. Cl.² .......................................... H01M 12/04
[52] U.S. Cl. ........................................ 429/27; 429/42; 429/39
[58] Field of Search .................. 429/27, 38, 39, 42, 429/15

[56] References Cited

U.S. PATENT DOCUMENTS

| 390,216 | 9/1975 | Warszawski | 429/42 |
| 3,905,832 | 9/1975 | Trocciola | 429/39 |
| 3,956,014 | 5/1976 | Landsman et al. | 429/42 |

*Primary Examiner*—Donald L. Walton
*Attorney, Agent, or Firm*—Burns, Doane, Swecker & Mathis

[57] ABSTRACT

A chemoelectric cell includes positive and negative electrodes which are spaced to define an interspace therebetween containing electrolyte fluid. At least one of the electrodes is a gas electrode. An electrochemically active substance in the gaseous state is delivered to the interspace so that the interspace serves as both a gas space and an electrolyte space.

13 Claims, 20 Drawing Figures

CHEMOELECTRIC CELL

This is a continuation of application Ser. No. 696,925, filed June 17, 1976 now abandoned.

BACKGROUND AND OBJECTS

The present invention refers to a chemoelectric cell containing a positive electrode and a negative electrode with electrolyte disposed in the interspace between the two electrodes, whereby at least one electrode is a gas electrode, with means for supply and discharge of an electrochemically active substance in the gaseous state.

Gas diffusion electrodes are used in many new electrochemical power sources, for instance metal air cells, methanol air cells, different types of fuel cells, etc. One side of the gas diffusion electrode is in contact with a gas phase (for instance the air space in a metal air cell or the hydrogen space in a hydrogen air cell) and the other side is exposed to an electrolyte phase which, in turn, is in contact with the other electrode in the actual chemoelectric cell (for instance the metal anode in a metal air cell).

Gas diffusion electrodes are used also in chemoelectric cells for electrolysis, for instance electrolytic cells for the production of chlorine and alkali. The present invention can also be used with such chemoelectric cells.

The nomenclature in this field is not very clear. In this description "gas electrode" means a complete electrode for electrochemical reaction of the substance which is supplied in the gaseous state to the electrode. The active part of the gas electrode where the electrochemical reactions are taking place in simultaneous contact between the electrode material, the electrolyte, and the gas, is herein called "gas diffusion electrode." The gas diffusion electrode is, in general, porous and contains therefore most often a gas phase, an electrolyte phase, and the solid electrode material.

The gas electrodes according to the present state of art exhibit, as will be demonstrated in some detail below, quite difficult design problems when it comes to achieving sufficient mechanical stability and assuring supply of gas and electronic conduction. The gas electrodes therefore occupy a much larger volume than what is dictated by the electrocatalytic function which, in turn, requires but very small amounts of catalysts, which in general occupy a very small part of the volume of the gas electrode.

The present invention involves a completely new design of gas electrodes which permit a sizable reduction of the volume requirements of the gas electrode. A number of other advantages are also obtained, like greater simplicity and a more robust mechanical design, which is of great importance, for instance in tractionary applications. I shall, to begin with, describe the invention using a metal air battery as an example. I will also give examples of hydrogen air batteries and electrolytic cells according to the invention.

Comparison between an alkaline iron air cell and an alkaline iron nickel cell of conventional design shows that the positive nickel oxide electrode in the conventional alkaline accumulator corresponds to the air electrode, which in this case comprises two gas diffusion electrodes and the air space between them. One advantage with the iron air cell compared to the iron nickel cell is, of course, that any active material need not be stored in the air electrode, which is fed with the oxygen of the air, whereas the positive nickel oxide electrode must contain all the active positive material for the electrochemical processes. This active material represents important weight, volume, and costs factors at large capacities. Material usage, volume requirement, and weight for conventional air electrodes are, however, not negligible items as was indicated above. The cathode cost is frequently a dominating item in the material calculus for iron air cells.

It is an object of the present invention to eliminate or minimize problems of the herebefore encountered.

It is another object to provide a novel electrochemical cell.

BRIEF DESCRIPTION

The present invention constitutes a new step in the development of this kind of power source which is in principle of the same importance as the step from the conventional positive nickel oxide electrode to the air electrode of the type described above. The principle of the invention can be described most easily in the following way. Gas is supplied to the gas diffusion electrode from the electrolyte side instead of from a special gas room on the other side of the gas diffusion electrode as characterized by the known state of the art. Mass transfer to and from the electrode material is therefore taking place from the very same electrode side. If the two sides of the gas diffusion electrode are utilized in this way a gas electrode according to the invention will consist of a single electrode instead of two electrodes with an air space in between. The gas is brought into contact with the electrocatalytically active electrode material from the electrolyte side. The gas space and the electrolyte space has, so to say, been combined in the interspace which was formerly used solely for the electrolyte according to the known state of the art. It is immediately recognized that the new principle gives several advantages.

The mechanical stresses are reduced since the electrode, according to the invention, does not have to take a differential pressure. Material usage is, of course, reduced to a large extent as well as weight and volume. The most surprising thing is, however, that good electrochemical performance can be obtained with gas electrodes according to the invention. The characteristic feature of the cell according to the invention is that the means for the supply of the electrochemically active substance in gaseous state is disposed so as to supply this gaseous substance in the interspace between the electrodes, whereby the interspace simultaneously serves as a gas and electrolyte space.

A particularly advantageous embodiment is that the gas electrode surface which is exposed to the interspace is at least partly covered with a layer which is permeable to the gas and hydrophobic to the electrolyte.

THE DRAWINGS

Other characteristic features and advantages of the invention will become apparent from the following description of preferred embodiments of the cell according to the invention, which description will refer to the drawing wherein.

DETAILED DESCRIPTION

Figure 1:
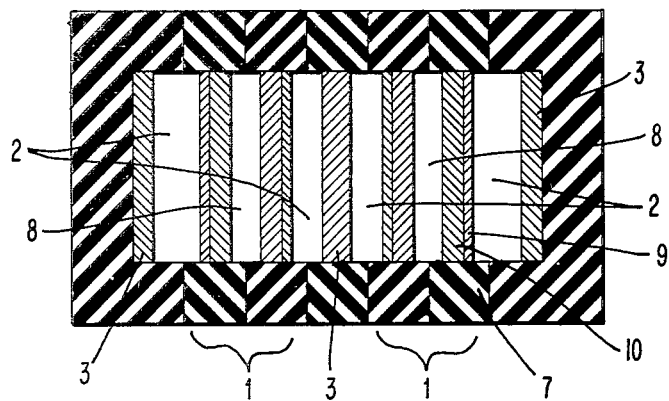
FIG. 1 shows a metal air battery according to the prior state of the art.
Figure 2:
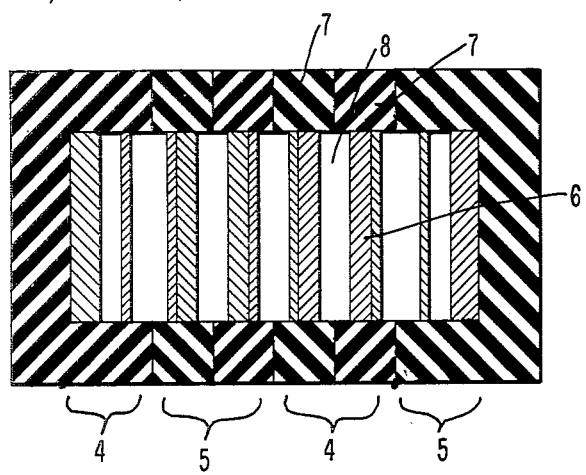
FIG. 2 shows a hydrogen air battery according to the prior state of the art.
Figure 5:
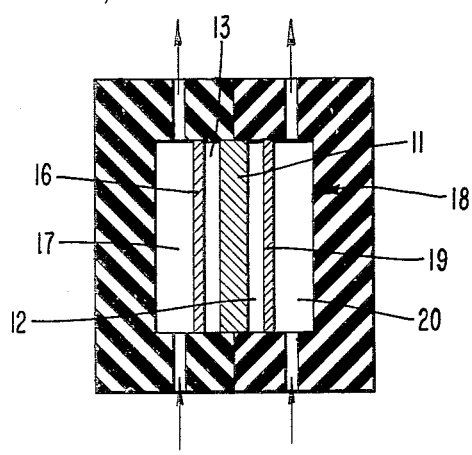
FIG. 5 shows an alkali electrolyzer with hydrogen anode and air cathode according to the prior state of the art.
Figure 3:
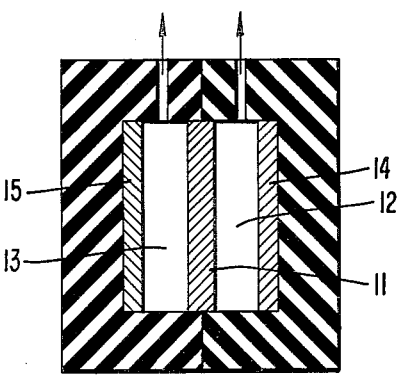
FIG. 3 shows a chlor alkali electrolyzer with air cathodes according to the prior state of the art.
Figure 4:
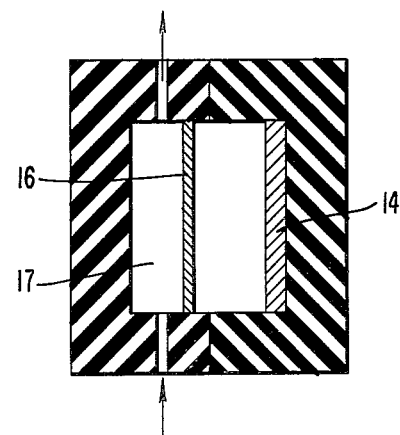
FIG. 4 shows an alkali electrolyzer with hydrogen anode according to the prior state of the art.

The state of the art is thus exemplified by structures comprising a metal air battery, FIG. 1, a hydrogen air battery, FIG. 2, and different kinds of electrolytic cells, FIGS. 3–5.

Prior Art

For simplicity the following example will refer to batteries built in pile shape as has been described in the Swedish Pat. No. 349,189 and the Swedish Pat. No. 217,054.

Metal air batteries frequently consist of a pile of air electrodes 1 and electrolyte spaces 2 arranged between them, and metal anodes 3 as shown in FIG. 1. Methanol air batteries can also be built in the same way with an electro-catalytically active methanol electrode for oxidation of methanol, which is supplied with electrolyte, instead of the iron electrode. FIG. 1 shows, in the same principal way, the design of a hydrogen metal oxide battery, for instance a hydrogen nickel battery with, in this case, the hydrogen electrode 1 and the metal oxide electrode 3.

The hydrogen air battery according to FIG. 2 contains air electrodes 4 and hydrogen electrodes 5. These batteries are, of course, furnished with current conductors, pole bolts, channels for supply and discharge of electrolyte and gases, separators, etc which are required for the operation of the battery, which components, however, are not shown in the figure.

Gas electrodes, for instance air electrodes or hydrogen electrodes according to the state of the art are framed in a plastic frame 7, which are connected so as to form a gas space 8 between the two electrodes. The gas electrode frequently also contains channels for the supply and discharge of the gas in question.

Air electrodes for metal air batteries, FIG. 1, are frequently of the so-called bi-functional type, which means that they can take charge with oxygen evolution with no damage to the catalytic function for the reduction of oxygen during discharge. Bi-functional air electrodes frequently consist of a finer layer 9 which is filled with electrolyte and which is exposed to the electrolyte, and a coarser layer 10 containing catalysts for the reduction of oxygen which is exposed to the air space and which is partly filled with air during normal operation. The so-called two-layer electrodes are also used in fuel cells, whereby the fine layer prevents gas leakage to the electrolyte space. The state of art in the field of gas diffusion electrodes is described in a treatise by H. A. Liebhafsky and E. J. Cairns entitled *Fuel Cells and Fuel Batteries*, published by John Wiley & Sons, New York, 1968.

The chlor alkali cell according to FIG. 3 contains a diaphragm 11 which separates the electrolyte space in a catholyte space 12 and an anolyte space 13. Hydrogen is developed at the cathode 14 during simultaneous formation of alkali in the catholyte space, where chlorine gas is developed at the chlorine electrode 15.

The chlorine electrode 15 has, in FIG. 4, been exchanged for a hydrogen electrode 16 with a gas space 17, which space is supplied with hydrogen during the simultaneous formation of hydrochloric acid in the anolyte space.

In FIG. 5 the cathode 14 of FIG. 3 has been replaced with an air cathode 18 comprising an electrode 19 and a gas space 20 which is supplied with air. There will be no hydrogen evolution at the cathode in this case. On the contrary, the oxygen of the air is reduced during the simultaneous formation of alkali in the catholyte space. Hydrochloric acid is formed in the room 13 at the oxidation of the hydrogen gas which is supplied to the anode 16 in the same way as in FIG. 4.

FIGS. 3–5 show only the basic principles of the cell concepts in question. The figures have therefore not been provided with known and necessary means for the supply of electric current and reactants as well as discharge of reaction products. The state of the art as well described for instance in *Encyclopedia of Chemical Technology*, 2nd Ed, Volume 1, pages 668–707, by Kirk-Othmer.

Present Invention

Figure 6:
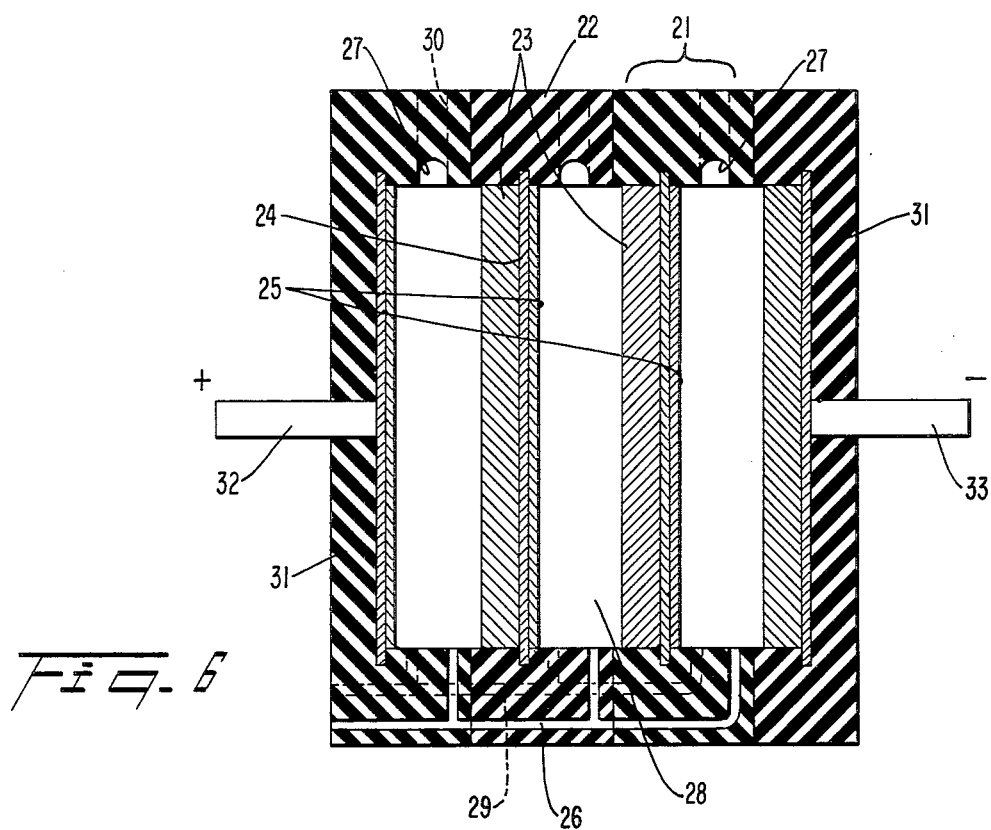
FIG. 6 shows an embodiment of a battery according to the invention.

FIG. 6 shows, in principle, a preferred embodiment of the present invention involving an iron air battery with bi-polar electrodes. One great advantage with the invention is that it makes possible the simple and rational design of bi-polar metal gas electrodes, for instance bi-polar iron air or zinc chlor electrodes.

The battery pile in FIG. 6 is built-up of elements 21 consisting of a plastic frame 22 containing bi-polar iron air electrodes including a porous iron layer 23 disposed on a separating wall 24 of nickel-coated iron which wall is electrically conducting and which carries the electrode material 25 of the air electrode on its other side. The electrolyte, in this example 5-N KOH, is supplied to interspace 28 by means of the channel system 26 and is discharged via overflow 27 according to the Swedish Pat. No. 363,193. Air is supplied to the combined air and electrolyte interspace 28 by means of the channel system 29 and is discharged from the upper part of the interspace 28 over the overflows 30. End elements 31 are arranged in the two ends of the pile, with monopolar electrodes being connected to the pole bolts 32. To make the description easily understood, the figure has been simplified a great deal with exaggerated dimensions.

If the modification of the prior art battery of FIG. 1, as depicted in FIG. 6, is carried out with electrodes which exhibit a hydrophilic surface towards the electrolyte, the cell will give comparatively poor load characteristics, also when there is a rich supply of air to the combined air and electrolyte space. This is due to the fact that the oxygen has to diffuse through a thick electrolyte film on the electrode surface. Therefore, it is suitable to take measures which have the purpose to assure the supply of oxygen to the electrocatalytically active material and, at the same time, to maintain a good electrolyte connection between the two electrodes 23 and 25. These two goals result in competition for the available volume in the interspace 28 and therefore a compromise must be made. The anode, that is the porous iron electrode, should be in contact only with the electrolyte, where as the cathode, i.e., the gas electrode, should be in contact with the electrolyte as well as air.

The distribution can be described by means of the gas/liquid surface ratio of the electrode surface. This is the ratio between the electrode surface which is mainly in contact with gas, and the electrode surface mainly in contact with liquid. Electrode surface, as used here, means the outer geometrical area of the electrode. Surface in contact with gas can be completely or partially covered by an electrolyte film, whereas surface in contact with liquid refers to such surfaces which are in direct contact with the opposite electrode, in this case the anode, by means of a continuous electrolyte mass.

Another important geometrical factor is the average distance between adjacent points of gas electrodes in contact with gas and liquid, respectively, according to the invention. The electric current must be conducted from the electrochemically active sites on the parts of the cathode which are in contact with gas, to the parts in contact with liquid, the latter being, in turn, connected with the anode via electrolyte bridges. The resistance in this current path must be kept on an acceptable level which can be done by minimization of the average distance between parts in contact with gas and liquid, respectively. Such distance could preferably be defined by the distance between the points of inertia for the surfaces in question and which can be called the gas/liquid distance. The resistance in this current path is, of course, also dependent upon the cross section of the current path and the resistivity of the electrolyte film. The cross section is, among other things, influenced by the thickness of the gas-diffusion electrode 25. Several other factors are of importance for performance and other properties of the chemoelectric cells according to the invention, but these factors do not have the same decisive importance as those mentioned above.

There are several possibilities for controlling the gas/liquid surface ratio and the gas/liquid distance, from controlled addition of air which is permitted to rise freely to mechanical means in the interspace between the electrodes. It is often of advantage to work with a gas/liquid surface ratio which is above 1, a particularly advantageous ratio range is 2-5, but also higher values for this ratio are frequently useful, for instance the range 5-20 or above. The gas/liquid distance should be as small as possible, preferably below about 1-2 cm, a useful value is below 0.5-1 cm and a particularly useful range is 0.1-0.5 cm or below. Short gas/liquid distances permit very thin gas diffusion electrodes, down to 0.01 to 0.02 cm or below. With higher values for the gas/liquid distance it may be necessary to work with electrode thicknesses within the range 0.4-0.8 mm. A possibility for reducing the resistance in the current path is thereby to dispose an electrolyte-filled layer adjacent to the electrochemical active and partially gas-filled layer of the electrode material, whereby the ion current makes its way from the electrolyte film to this electrolyte-filled layer in order to be then conducted over to the electrolyte in the interspace between the electrodes.

There are a large number of possible embodiments of the invention. This richness of alternatives extends partly from the fact that the invention can be applied for different kinds of power sources and electrolyzers like metal air cells, methanol air cells, hydrogen air cells, hydrogen metal oxide cells, alkali electrolyzers, etc. The different cell types can, in turn, be built up in different ways, for instance with so-called mono-polar electrodes or bi-polar electrodes. Chemoelectric cells with two gas electrodes, for instance the hydrogen air cell, can be made with the one electrode according to conventional technic and the other, gas electrode designed according to the invention; alternatively, with the two gas electrodes designed according to the invention. The latter embodiment requires special separators in the interspace since then two gases shall be supplied to the corresponding electrode materials from this interspace.

The method to supply gas to the gas electrodes, which is a characteristic feature of the invention, can be obtained by several different co-operating measures which, of course, are also influenced by the cell type in question and other special requirements. These measures can be described as (1) constructive modifications of the means for supply and discharge of electrolyte and gas to the interspace, (2) the introduction of special means like conducting and distributing structures in the interspace and (3) constructive modifications of the electrodes for the purpose of facilitating the supply of gas according to the invention. These measures can be combined with each other and with special treatments of the electrode material for the purpose of making parts of its (1) better gas receptive (most frequently hydrophobic), (2) electrolyte receptive (hydrophilic) or (3) blocked (sealed) to prevent supply of gas as well as electrolyte to the electrode parts in question. It is no difficulty for the artisan with the knowledge of the spirit of the invention to take suitable measures of this kind and therefore we shall in the following only mention a few embodiments which are particularly preferred so as to illustrate the possibilities of these alternative routes. An iron air battery will be initially described with bi-polar electrodes, according to FIG. 6, which gives a simple exemplification of the spirit of the invention.

A complication with metal air cells compared to fuel cells is that two modes of operation are used, that is, charge and discharge. During charge, oxygen is developed in the cell when the active material of the metal electrode is reduced to metal. One may use the air electrode also for oxygen development during charge but there are also embodiments, e.g., the so-called third electrode which is used for the oxygen development during charge. The electrode materials which are being used in air electrodes frequently contain one or several metals which show considerable resistance towards oxygen development during charge, whereas other electrodes like platimized and hydrophobic porous carbon structures deteriorate during charge and therefore require a special fine layer on the electrode where the oxygen is developed, or a third electrode which is used only during charge.

Figure 7:
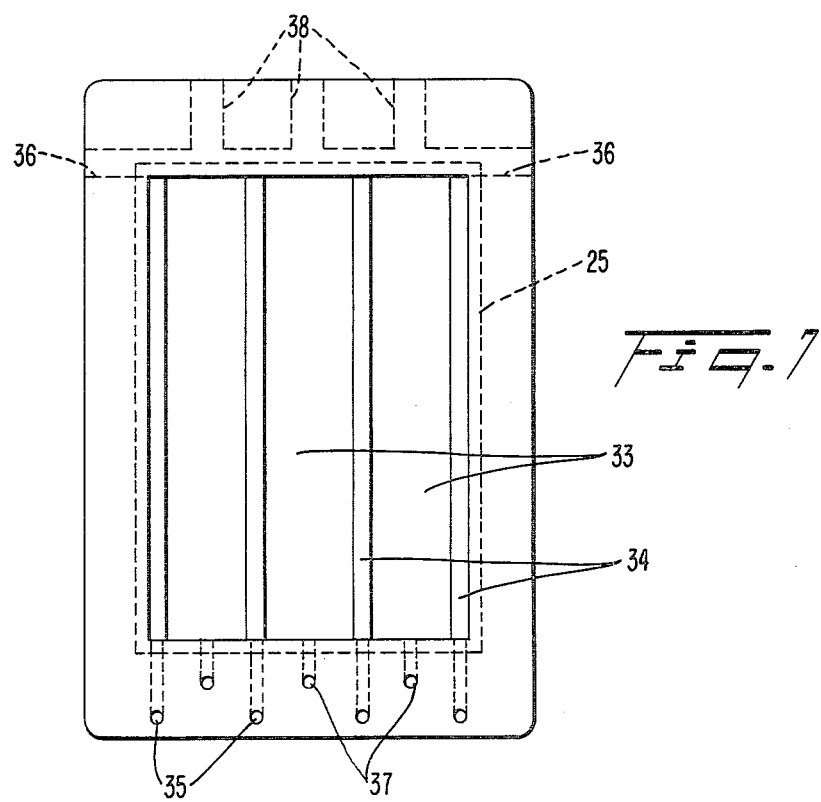
FIG. 7 shows an embodiment of an air cathode according to the invention as seen from one of the interspaces between the electrodes in a battery.

FIG. 7 shows a simple embodiment of an air electrode seen from one of the interspaces 28 in FIG. 6. The dimensions are also in this case exaggerated for clarity. The cathode surface is intermittently hydrophobic and hydrophilic. An originally hydrophilic structure, for instance, corresponding to the coarse layer of the two-layer electrode manufactured according to the recommendations in the Swedish Pat. No. 360,952, has been made hydrophobic in parallel strips 33 which intermix with non-treated hydrophilic parts 34. The width of the hydrophobic strips is, in reality, 0.3 cm and the widths of the hydrophilic ones 0.1 cm and, therefore, the distance between the points of inertia of the surfaces is 0.2 cm.

In operation, electrolyte is supplied via the channels 35 and is discharged via the overflows 36. Air is supplied via the channels 37 and is vented from the interspace to the surrounding vessel, which is not shown, via the exhaust gas channels 38. In operation, the air will preferably follow the hydrophobic parts of the cathode, while the electrolyte will follow the hydrophilic ones. This effect can be magnified by having also the anode covered with a hydrophobic layer in the opposite position of the corresponding layer of the cathode. Another possibility is to seal the anode completely on these surfaces by means of a hydrophobic film of, for instance, polypropylene which can be accomplished by means of plasma spraying or in other ways. Under these conditions, the gas/liquid surface ratio is about equal to the ratio between hydrophobic and hydrophilic electrode surface, that is, 3.

The hydrophobic strips 33 in FIG. 7 can preferably be obtained by means of impregnation with Teflon® dispersion, for instance, containing 15% Teflon followed by evaporation and sintering at a temperature around 300° C. according to the general technique with hydrophobization of porous electrode materials, particularly fuel cell electrodes. In order to produce the geometric pattern desired, the Teflon dispersion can be painted in corresponding strips. The parts of the electrodes, which shall remain hydrophilic, may also be protected with a master sheet or alternatively painted with a stripable paint or a protective film which can be dissolved in the electrolyte or vaporized during the heat treatment of the material. Another possibility is to press a nickel net or a perforated nickel plate, etc against a hydrophobic ground structure whereby the net etc will serve as the hydrophilic surface.

Figure 8A:
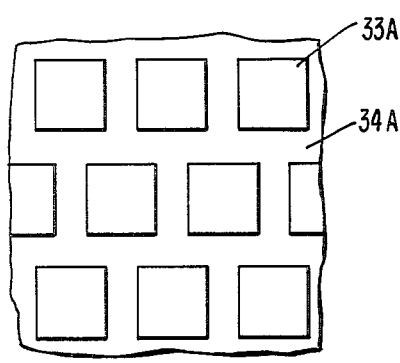
FIGS. 8A–8C show alternate patterns for the cathode surface according to FIG. 7.
Figure 8B:
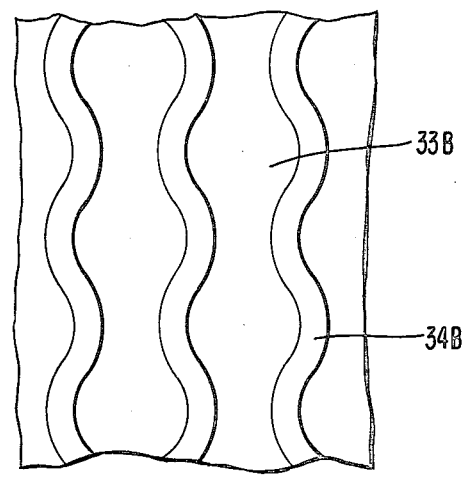
Figure 8C:
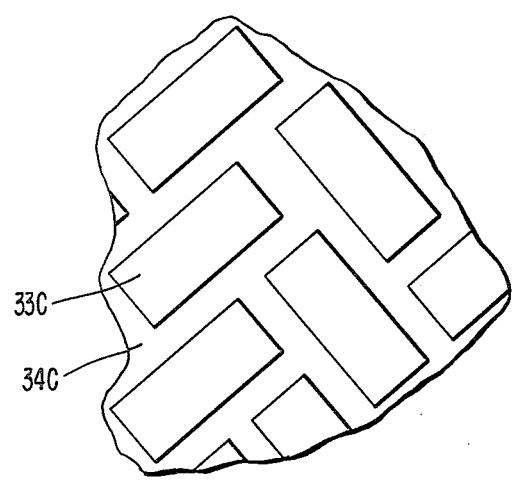

FIG. 7 shows for simplicity a pattern with parallel vertical strips. One may also visualize many other patterns depending on special requirements to assure a uniform flow over the whole cross section. FIGS. 8A–8B give examples of such useful alternative patterns. Thus, in FIG. 8A, the hydrophobic areas 33A are rectangular with the remainder of the surface 34A being hydrophilic. In FIG. 8B, the hydropholic strips 33B are wavelike. In FIG. 8C, the hydropholic areas 34C are rectangular and extend at an angle to horizontal and vertical.

State of the art materials can in general serve very well as the electrode materials in the iron air cell according to FIGS. 7 and 8. The iron electrode may thus be made according to the Swedish Pat. No. 360,952, as well as the active material of the air cathode. It is, however, useful to apply the catalysts for the oxygen reduction in the air touched strips and catalysts for oxygen development in the electrolyte touched strips.

Since no differential pressure can be applied, it is necessary to make the hydrophobization of the cathode material fairly strong. It may also be desirable to work with comparatively large pore dimensions and high porosity in the structure. This can be done easily in this case because of the small mechanical stresses on the structure. When the requirements of life are modest, one may also use a Teflon-bonded active carbon structure containing incorporated and activated nickel nets.

For more qualified purposes with requirements involving higher operational temperature and charge current, one may use a partially oxidized and hydrophobized nickel electrode with catalysts of silver, cobolt or nickel basis. The interspace can be completely open as in FIG. 7, or supplied with supports and spacer elements. It may sometimes be necessary to wrap the anode in a separator to prevent direct contact between the oxygen of the air and the active anode material.

During charging, oxygen will develop primarily on the hydrophilic parts of the cathode, which preferably are covered with materials like nickel which decreases the oxygen overvoltage, whereafter the gas will find its way over the hydrophobic strips. The very simple embodiment of the invention according to FIG. 7 gives a surprisingly good technical effect. It is not surprising that the oxygen transport will be satisfactory in this way but very much so that ion transport between the electrodes does not deteriorate too much.

There is no difficulty for the artisan to design a complete system with all necessary functions for this kind of power source on the basis of the above description. An important question relates to the distance between the electrodes, that is, the width of the interspace which among other things depends on whether the battery is intended for operation at low or high current densities. High current densities, of course, require more air which influences the dimensioning of the interspace. The width is in general around 0.2 mm to 2.0 mm. With small distances between the electrodes, it may be useful to introduce special spacer elements which may also be used to control the flows in the interspace.

A comparison between the iron air battery described in the Swedish Pat. No. 360,952 gives the following advantages. The active electrode material which may be said to correspond to the composition of the coarse layer in example 5 may be reduced to 0.2 mm, that is 30% of the reference electrode, which is equivalent to the electrochemically active zone in the material. This reference electrode was dimensioned mainly for mechanical reasons. If the thickness of the electrolyte space is the same in the example of reference, the so-called cell-pitch for a given capacity will be reduced with about 30%, which corresponds to an increase of the energy density (per volume unit) with about 40%. Under otherwise comparable conditions, the power density (per unit area) will be reduced by about 20%, but on the other hand the amount of area which carries current will be increased by about 40% per unit volume. Therefore, the power density for the battery has also been improved considerably with the design according to the invention.

It is also obvious that the invention does permit a simple solution to the difficult problem of designing bi-polar metal air electrodes. Bi-polar electrodes reduce the volume of the battery and its weight, since there will be no need for current conductors. Furthermore, a completely uniform current distribution over the cross section of the cell will be obtained which means that structures like metal nets, frequently used in iron electrodes for better electronic activity, may be eliminated which also saves weight, volume and cost.

Another important thing, which is not immediately realized, is that a better cooling is obtained compared to the state of art. Heat is developed particularly in the cathode material which is now cooled efficiently in direct contact with air and electrolyte, whereby the short distances prevent thermal spikes in the material. It is therefore possible to increase the operating temperature compared to cells according to the state of art without a sacrifice in life of the cell.

The beneficial effect on the cooling of the air cathode may also be observed with mono-polar air elements which are in contact with cooling electrolyte on both sides, corresponding to the application of the invention for metal air cells with a principle design according to FIG. 1. The higher operating temperature is of very great importance for performance and reduces the size of the auxiliary system which is mainly governed by the cooling requirements. A useful operation temperature is now 50°-60° C. compared to 40°-50° C. with the corresponding iron air cells according to the prior state of the art.

A great advantage with gas electrodes according to the invention, which is of particularly great importance with air electrodes, is that the gas will take up moisture very fast in the direct contact with the electrolyte. With air electrodes according to the prior state of the art, such humidification will also take place in the air space (provided that the incoming air is not already saturated with moisture). In this case the moisture will be taken up from the electrolyte in the gas diffusion electrode which frequently leads to local drying out, particularly near the air inlet to the air space. Such local drying out will, in turn, cause severe corrosion damage which produces local constrictions in the air space. Metal air batteries according to the prior state of the art therefore require that the air be moistened before entrance into the air spaces, or special corrosion-preventive measures be taken in the air electrode itself. One consequence of the circumstances discussed above is that the cathode can be loaded harder, for instance during operation on pure oxygen, or during operation at increased pressure on oxygen and/or oxygen air mixtures. This is of interest in special applications like pressurized iron oxygen batteries for submarine propulsion. Gas electrodes according to the invention can also be utilized harder under extreme conditions than what is possible according to the prior state of the art thanks to the better conditions for heat transfer.

Figure 9:
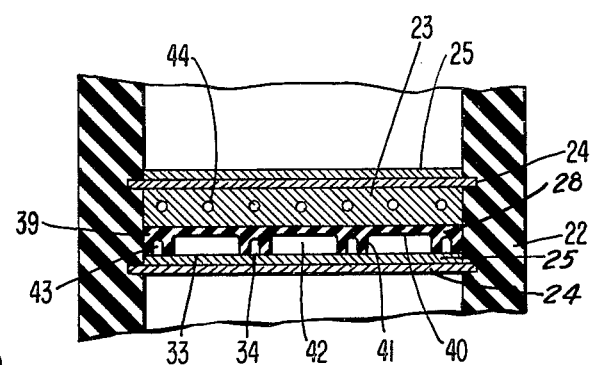
FIG. 9 shows a cross section of a cell according to the invention with separate channels for gas and electrolyte disposed in the interspace between the electrodes.

After this presentation of a very simple possible embodiment of the invention, whereby I have discussed the advantages of the invention, I shall now describe more complicated embodiments which require special measures and means in the interspace and in the electrodes. FIG. 9 shows an embodiment with a special structure 39 disposed in the interspace 28 which governs the flows of gas and electrolyte in a more controlled manner. FIG. 9 shows several separate features and one or more of these need not be used in less demanding applications. FIG. 9 shows a cross section through the electrodes and interspace, as seen from above, whereby for simplicity the gas and electrolyte flows are arranged vertically as in FIGS. 6 and 7. (The dimensions are also exaggerated for the sake of clearness). The structure 39 can be manufactured from a conventional separator material which has been compacted and eventually further sealed by impregnation or welding in the surface portions 40 and possibly also in the side surfaces 41. Separator materials which are useful for alkaline systems are described in *Alkaline Storage Batteries* by U. Falk and A. Salkind, particularly the pages 26, 28, 70, 140, 142, 168, 178, 202, 240, 243, 246 and 349. This will give a straight gas channel 42 which supplies gas to the hydrophobic strips 33 on the air electrode. Electrolyte is supplied via channels or traces 43 and is distributed in the porous electrode material 34. Channels 44 are also provided in the anode for electrolyte transport.

During charging, oxygen is developed primarily in the channels 43. Side connections can also be arranged between the electrolyte channel 43 and the air channel 42 to make oxygen pass over to this channel.

As has been mentioned above, several of these features may be dispensed with and others may be added. With respect to electrolyte circulation, there exists a possibility to arrange internal circulation with the channels 44 in the anode and the channels 43 as down-comers, and eventually the air channel 42 as risers (electrolyte would here be added through the air channel 42).

The embodiment with specially formed channels in the interspace according to FIG. 9 makes possible a variation of the airflow within wide limits. Furthermore, this will give a good separation between the electrodes, which reduces risks for short circuits.

Figure 10:
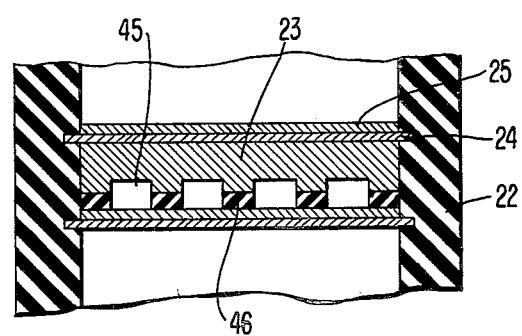
FIGS. 10–12 show variations of the channels according to FIG. 9.

There are obviously many variations of the embodiment which was shown in principle in FIG. 9. One such possibility is to arrange the channels in the iron electrode as shown in FIG. 10. Channels 45 have been here disposed in the anode 23, which are eventually sealed for instance by painting or welding of a plastic film. Electrolyte contact between the electrodes can be obtained by means of free electrolyte film or electrolyte-filled porous separator columns 46.

Figure 11:
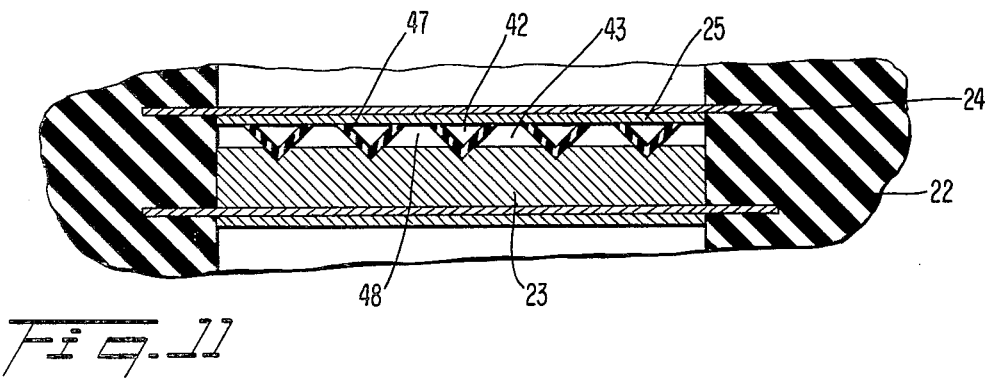

FIG. 11 shows a variation with profiles of plastic 47 in channels 48 which simultaneously serve as spacer elements between the electrodes, and which divide liquid and gas-touched parts. These inlets can be manufactured of polystyrene or other suitable polymeric material.

Figure 12:
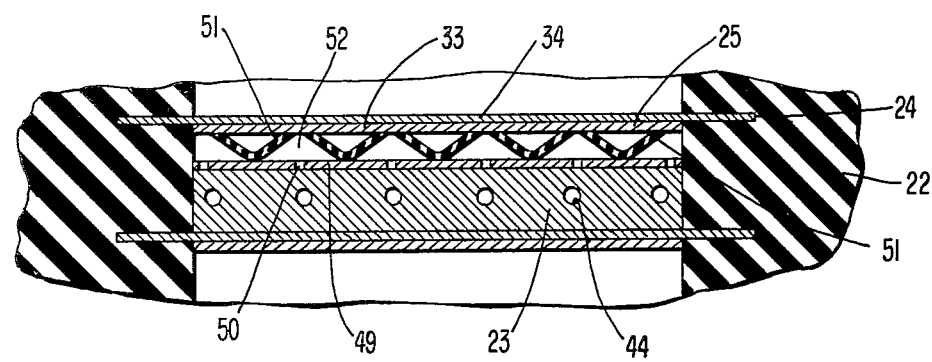

FIG. 12 shows a coherent structure which is composed of a thin bottom foil 49 supplied with holes 50 adjacent the electrolyte conducting channels 52. The adjacent channels, defined by wings 51, conduct air. The space 52 can, with advantage, be filled with porous electrolyte absorbing separator materials, whereby the electrolyte circulation is preferably obtained by means of channels 44 arranged in the anode.

Simple flow patterns have been used in the above examples for the iron air battery used as an example. Air is supplied to the lower parts of the interspace and is vented in its upper part. The electrolyte, in principle, follows the same path in the interspace.

The invention is, of course, not limited to these special flow patterns. There are different possibilities for controlling gas flow as well as electrolyte flow. For instance, supporting structures and divider elements can extend diagonally from one inlet channel to an outlet channel. Quite different embodiments, like zig-zag flows or spiral flows for gas as well as liquid, are also possible.

The electrodes do not need to be essentially planar as shown in the figures. Electrodes may thus be corrugated to a wave shape so as to increase the electrode surface in the given cell volume. The electrode may also contain wings of the electrode material, the edges of which contact the electrolyte phase. Plain electrode systems can also be rolled to cell cylinders which may be contained in cylindrical cell vessels. Hybrid forms are also possible utilizing features from the prior art and the present invention.

Figure 13:
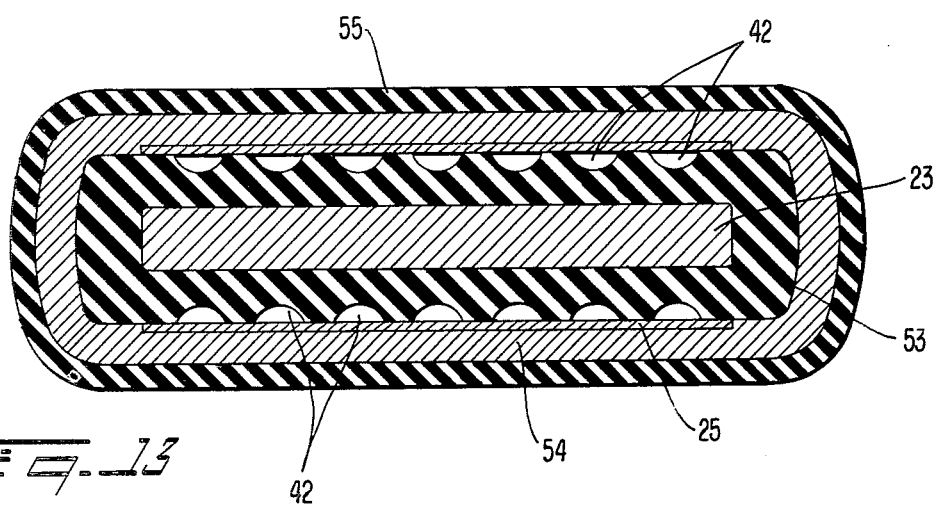
FIG. 13 shows a so-called air respirating metal air cell according to the invention.

FIG. 13 shows such an example with a self-respirating metal air cell seen in cross section from above. The metal electrode 23 is wrapped in a porous separating and electrolyte-impregnated structure 53 (which in principle corresponds to the structure 39 in FIG. 9) having channels 42. The cathode material 25, which can be Teflon-bonded active carbon supported by a thin nickel-coated iron net 54 and protected with a porous foil of polyethene 55, is wrapped around the metal electrode. Air comes in contact with the electrode material as well as from the interspace on the outside according to the invention as well as from the outside according to the state of art for self-respirating metal air cells.

Figure 14:
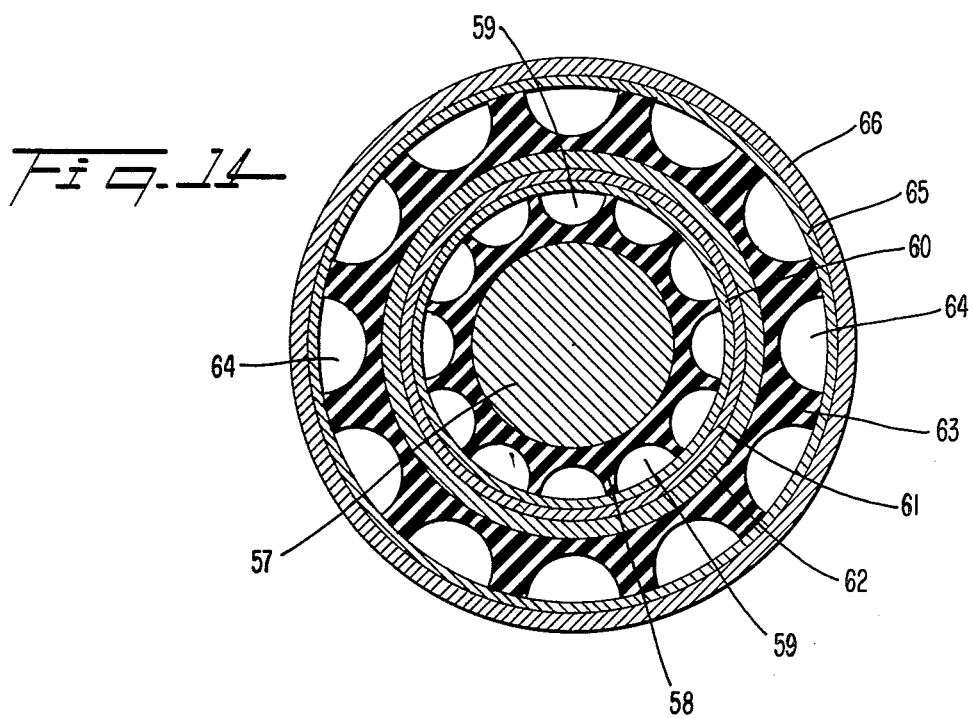
FIGS. 14–15 show a cylindrical iron air battery according to the invention.
Figure 15:
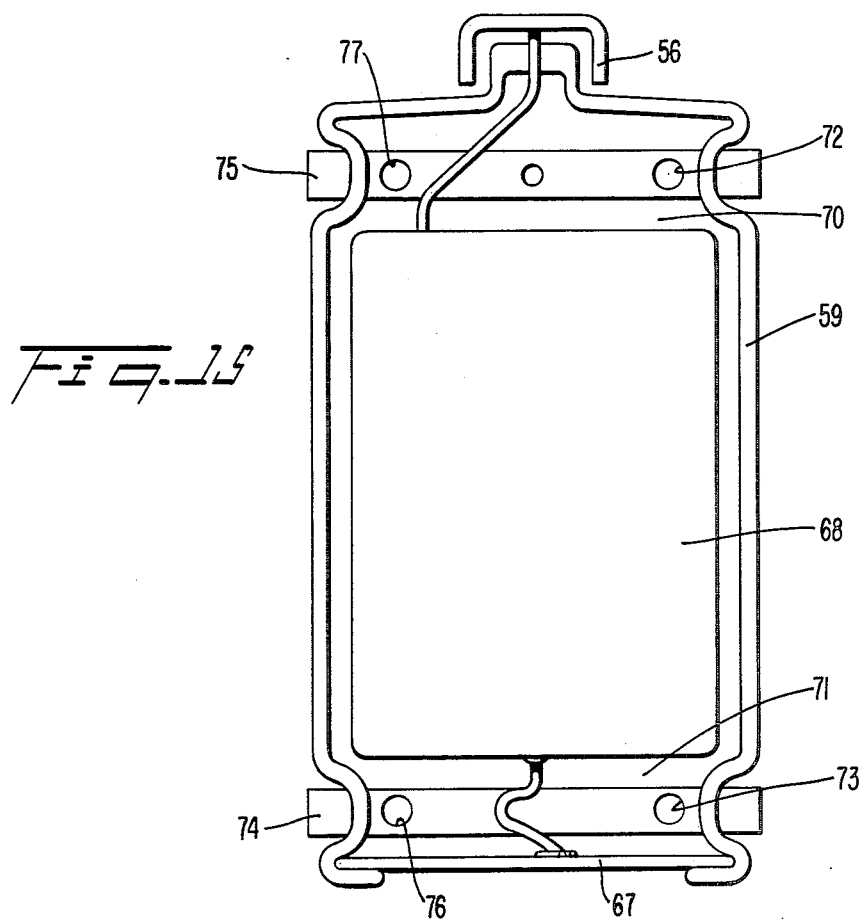

FIGS. 14–15 show a cylindrical iron air battery, which may replace conventional so-called dry cells, consisting of two iron air cells which have been joined in series by means of a bi-polar iron air electrode. The negative pole 56 of the battery is connected to the central porous iron air electrode 57 which is surrounded by an electrolyte-impregnated separator 58 having air channels 59 for the supply of air according to the invention. The cathode material 60 is arranged on the plate 61 which, in turn, carries a layer of porous iron 62. These three components 60, 61, and 62 constitute a bi-polar iron air electrode. Thereafter there is another layer of electrolyte-impregnated separator material 63 having air channels 64 which face the cathode material 65 arranged on the cylinder 66 which is connected to the positive pole 67 of the battery.

FIG. 14 shows the battery body proper with the components 57–66 in cross section seen from above. FIG. 15 shows a cross section through the complete battery seen from the side, with the battery body 68 being connected to the two poles 56 and 67 and contained in an isolating cylinder of plastic. Spaces 70 and 71 are arranged in the upper and lower part of the cylinder, which spaces serve for the supply and discharge of air to and from the channels 59 and 64. These spaces communicate with the surrounding atmosphere by means of holes 72 and 73 which may be arranged as in FIG. 15 in the mantel surface of the cylinder. The holes can be locked by means of movable rings 74 and 75 which are supplied with holes 76 and 77 corresponding to the holes 72 and 73 in the periphery of the cylinder. Air may, of course, be supplied in an analogous manner via the top and the bottom of the battery. It is no difficulty for the artisan to manufacture a battery according to this description and by means of the technology which has been developed for zinc air cells, alkaline manganese dioxide elements, cylindrical nickel-cadmium batteries, etc. The iron air battery according to FIGS. 14 and 15 has an energy density of several hundreds Wh/kg. is rechargeable, and is manufactured of inexpensive materials which do not constitute a nuisance to the environment, and therefore represents an important step forward compared to the battery types now in use. The battery may also be made in larger sizes, for instance, tractional applications.

The above description has, for simplicity, been made in relation to iron air batteries of different kinds for the purpose of illustration. The same technique can be used for cadmium air batteries of different kinds as well as for zinc air batteries. The state of the art with respect to methods for the manufacture of these electrodes, useful separators, etc is well described in the book of Falk and Salkind referred to above. With respect to the zinc electrode, a special reference can be given to the book *Zinc-in-Alkali Batteries* by R. V. Robker, published by The Society for Electrochemistry in England, August 1973. Zinc air systems are complicated by the fact that the zinc electrode goes completely or partially into solution during discharge. This does, however, not produce special problems for the application of the present invention. On the contrary, it has been shown that problems with the zinc electrode, that is, shape change and dendrite growth, are solved in a better way with air electrodes according to the invention. This depends probably on the uniform current distribution and the means in the interspace between the electrodes which also seem to prevent dendrite growth.

It is also no difficulty for the artisan to use the invention for other types of power sources which use gas electrodes. The examples may thus be applied directly also to hydrogen nickel oxide batteries whereby the negative metal electrode is replaced with a positive nickel oxide electrode and the positive air cathode with a negative hydrogen electrode.

One may, of course, also replace the nickel oxide electrode with other positive electrode materials which are used in alkaline systems, like silver oxide, mercury oxide or iron oxide. Furthermore, the examples can be applied to methanol air batteries if the metal electrode is replaced with a methanol electrode of porous nickel with noble metal catalysts of common type. One modification of this embodiment is that the carbon dioxide produced is vented through channels in the electrode by means of pH-gradients in the electrode. It may thereby be useful to minimize the contact between the electrolyte and air cathode, whereby the parasiting oxidation of methanol is reduced by means of sealing as shown in FIG. 9. Methanol may preferably be added to the methanol electrode by channels corresponding to the channels 44 in FIG. 9.

The invention may also be used with power sources like hydrogen air cells where the two electrodes are gas electrodes. One simple form of such embodiment is a combination of a conventional electrode according to FIG. 1 which may, for instance, be fed with hydrogen produced by reforming of methanol or hydrocarbons, whereby the positive electrode can be an air electrode of the same kind as described above. The hydrogen electrode is separated from the air electrode and an interspace according to the invention for the supply of air to the air electrode from this interspace.

Figure 16:
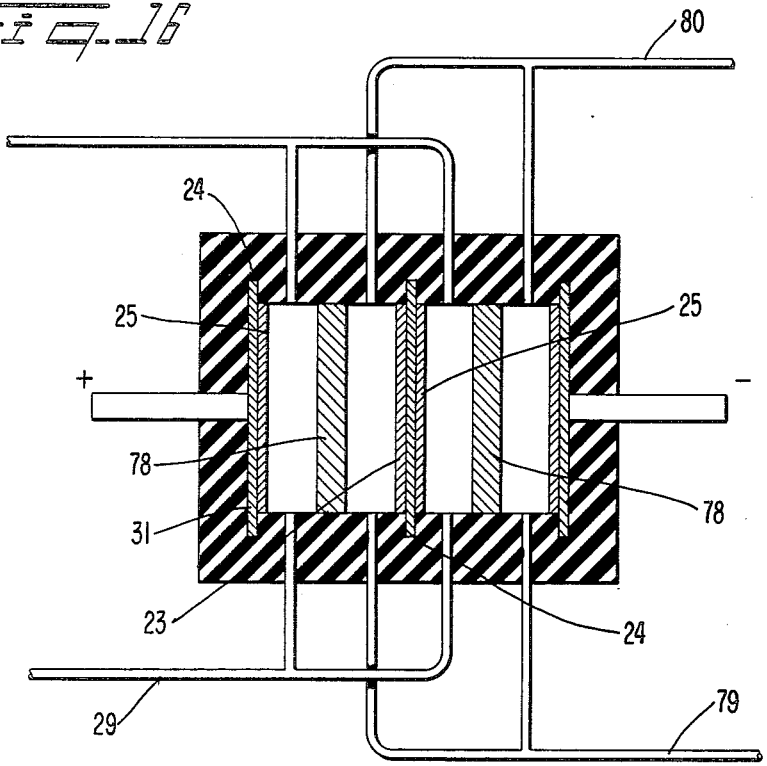
FIG. 16 shows a chlor alkali electrolyzer with air cathode according to the invention.

FIG. 16 shows a hydrogen air battery with both hydrogen and the air electrodes designed according to the invention. In this case, hydrogen and air flows are separated from one another in the electrolyte space by means of an electrolyte-filled separator 78 which, at the same time, serves as a guiding element for the respective gas flows in contact with the electrodes. Air is supplied to the electrodes 25 via the piping system 29 and is vented via the piping system 30. Hydrogen is supplied an analogous manner to the electrodes 23 via the piping system 79 and is conducted away via the piping system 80. Other necessary structure, for instance, to provide electrolyte circulation, etc are not shown.

Quite large requirements are, of course, put on the separator 78 which must prevent hydrogen and air from coming into contact with each other and it is therefore useful to make this separator in several different layers. The separator may also contain a sheet of sintered porous metal in order to improve further the mechanical stability. The separator may also contain channels for electrolyte supply and discharge to assure the supply of electrolyte to the gas diffusion electrodes.

Figure 17:
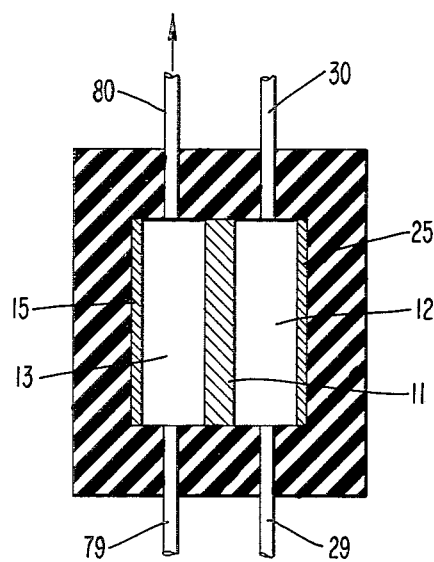
FIG. 17 shows an alkali electrolyzer with hydrogen anode according to the invention.
Figure 18:
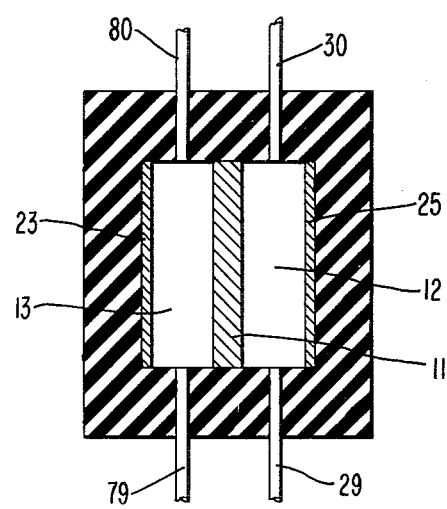
FIG. 18 shows an alkali electrolyzer with an hydrogen anode as well as an air cathode according to the invention.

FIG. 17 shows a chlor alkali electrolyzer according to the invention having an air electrode 25 arranged in the catholyte space 12 according to the invention. A corresponding alkali electrolyzer with hydrogen anode 23 according to the invention is shown in FIG. 18. FIG. 18 shows an alkali electrolyzer with both a hydrogen electrode 23 and an air electrode 25 according to the invention. For more details concerning the constructive design of this electrolyzer, see U.S. Pat. No. 3,864,236. It is not difficult for the artisan to design chlor alkali electrolyzers and alkali electrolyzers according to the invention with the knowledge of this patent and, for instance, U.S. Pat. Nos. 3,124,520 and 3,262,868 and the description above. It is of particular advantage to modify bi-polar designs like the GLANOR ® electrolyzer with air cathodes according to the invention. The technology in this field is well described for instance in the Monograph No. 154, "Chlorine," published by the American Chem. Soc.

The present invention is of a general character and can be applied for all kinds of chemoelectric cells where gas diffusion electrodes are used in contact with an electrolyte. The invention is, of course, not limited to the embodiments which have been described above but can also be applied for all kinds of chemoelectric cells with gas electrodes. The spirit of the invention is very simple as is apparent from the above description. To realize the technical effect possible, special measures are required which vary from case to case. There is, however, no problem for the artisan to transform the spirit of the invention to operable chemoelectric cells applying known technology in each such case.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A chemoelectric cell comprising:
   a positive electrode,
   a negative electrode spaced from said positive electrode to define an interspace therebetween for conducting electrolyte,
     one of said electrodes comprising a gas electrode having one side facing said interspace,
   a porous separator disposed in said interspace and abutting against said side of said gas electrode,
     said separator defining passageways open toward said side of said gas electrode for conducting gaseous substance from an inlet end to an outlet end of said interspace;
   portions of said side of said gas electrode located along said passageways being coated with electrolyte repellant material,
   means for delivering electrochemically active gaseous substance into said passageways for travel along and reaction with said portions of said side of said gas electrode that are coated by said electrolyte repellant material, and
   means for delivering liquid electrolyte to said interspace to impregnate said separator so that electrolyte is in contact with areas of said side of said gas electrode which are abutted by said separator.

2. A chemoelectric cell according to claim 1 wherein the ratio between the areas coated with electrolyte repellant material and the remaining areas of gas electrode surface is in the range of 5-20.

3. A chemoelectric cell according to claim 1 wherein the average distance for the current path between said electrolyte repellant and remaining areas of the gas electrode is no greater than about 1-2 cm.

4. A chemoelectric cell according to claim 1 wherein the average distance for the current path between said electrolyte repellant and remaining areas of the gas electrode is no greater than about 0.5-1 cm.

5. A chemoelectric cell according to claim 4, wherein said distance is within the range 0.2-0.5 cm.

6. A chemoelectric cell according to claim 1 wherein the negative electrode material is iron and the gas electrode is an air electrode.

7. A chemoelectric cell according to claim 1 wherein the positive electrode material is zinc and the gas electrode is an air electrode.

8. A chemoelectric cell according to claim 1 wherein the negative electrode material is cadmium and the gas electrode is an air electrode.

9. A chemoelectric cell according to claim 1 wherein the negative electrode material is zinc and the gas electrode is a chlorine electrode.

10. A chemoelectric cell according to claim 1 wherein the negative electrode is a hydrogen electrode and the positive electrode material is nickel oxide.

11. A chemoelectric cell according to claim 1 wherein the negative electrode is a hydrogen electrode and the positive electrode material is iron oxide.

12. A chemoelectric cell according to claim 1 wherein the negative electrode is a hydrogen electrode and the positive electrode is an air electrode.

13. A chemoelectric cell according to claim 1 wherein the negative electrode is a methanol electrode and the positive electrode is an air electrode.

* * * * *